Dec. 26, 1950      C. N. TURNER      2,535,466

SHOCK ABSORBING HANDLE FOR POWER MOWERS

Filed Aug. 24, 1948

INVENTOR.
C. N. TURNER
BY
*Merrill M. Blackburn*
ATTORNEY

Patented Dec. 26, 1950

2,535,466

UNITED STATES PATENT OFFICE 2,535,466

SHOCK ABSORBING HANDLE FOR POWER MOWERS

C. Neal Turner, Prophetstown, Ill., assignor to The Eclipse Lawn Mower Co., Prophetstown, Ill., a corporation of Illinois Application August 24, 1948, Serial No. 46,831

2 Claims. (Cl. 16—111)

My present invention relates to handles for power mowers and more particularly to shock-absorbing means to be attached thereto and serving to prevent the transmission of vibrations from the engine of the mower to the hands of the user.

Among the objects of this invention are the provision of a handle for a lawn mower which is equipped with means for eliminating the major part of the vibrations which are ordinarily transmitted from the lawn mower engine, through the handle, to the user of the machine; the provision of a shock-absorbing means between the engine of the mower and the hands of the user of the machine; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof:

Figure 1:
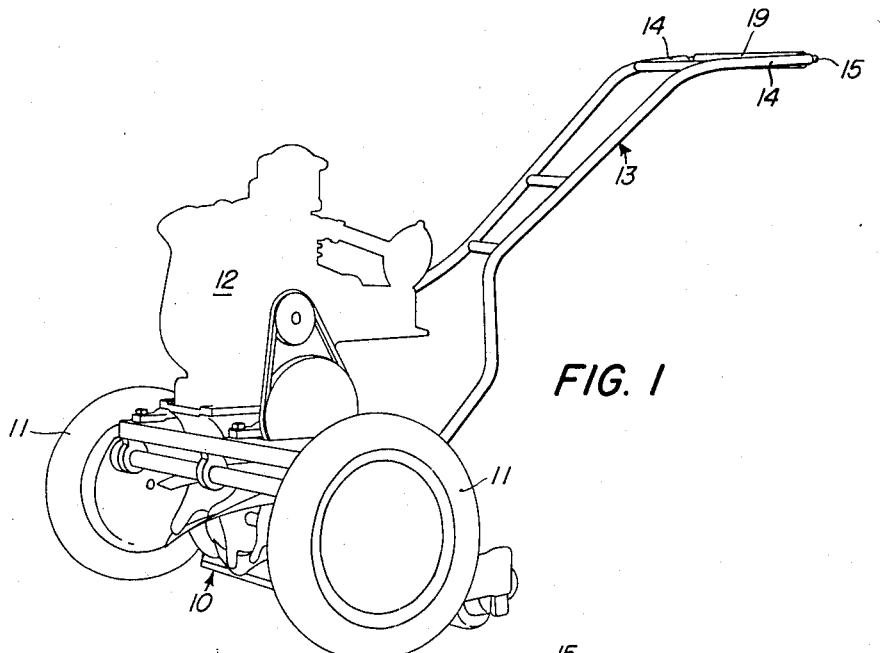
Fig. 1 represents a perspective view of a power mower with a branched handle of the type preferred.
Figures 2, 3:
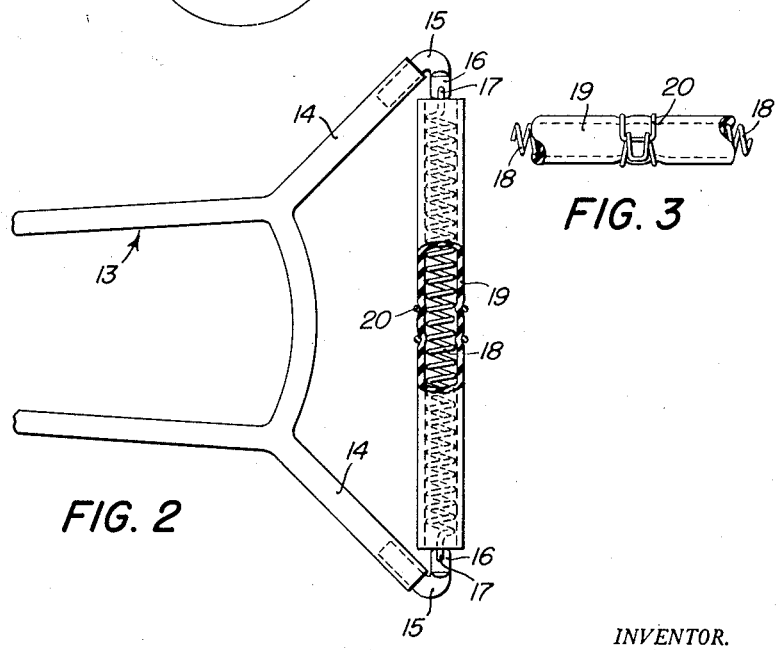
Fig. 2 represents a fragmentary plan view of the end part of a handle, adjacent the user thereof, when the mower is being utilized.
Fig. 3 is a fragmentary detail showing a clamping means for holding parts against relative movement.

Reference will now be made in greater detail to the annexed drawings for a more complete description of this invention. In Fig. 1, the numeral 10 denotes, in general, the body of the mower, numeral 11, the wheels thereof, and numeral 12, the engine for propelling the mower. The handle itself is denoted, in general, by numeral 13, and the divergent branches thereof by numeral 14. Preferably, the handle is fabricated from tubular stock while at least the remote ends of the branches 14 have hollow ends for the reception of the angles 15. The second ends of these angles 15 are flattened, as indicated at 16, and have holes formed therein for the reception of the hooked ends 17 of the spring 18 which is preferably surrounded by a flexible tubular member, as, for example, a piece of rubber hose, shown at 19. In order to prevent endwise movement of the hose 19, a suitable clamp, as 20, may be drawn tightly about the hose and this will prevent relative movement of the spring 18 and the hose 19.

It will readily be appreciated that the major portion of the vibration passing from the motor 12 through the machine into the handle will largely be absorbed by the spring 18 and the most of any remaining vibration will be dampened out by the rubber member 19, so that substantially no vibrations from the engine reach the user of the machine.

It will of course be understood that various modifications may be made in the structure disclosed herein without departing from the spirit of this invention as defined by the appended claims.

Having now described my invention, I claim:

1. In a power mower handle divided at both ends and having cross-bars connecting the two sides of the handle; the handle extremities remote from the mower being hollow and having hook-shaped attaching members having one end extending into the extremities of the sides of the handle, a coil spring under tension connected to the hook members, said coil spring being surrounded by a hollow flexible member, and said spring and hollow flexible member serving to prevent transmission of vibrations from the power unit to the hands of the user.

2. In a power mower having a divided, rigid handle, the ends of which, remote from the mower, are spaced apart a considerable distance and have a coil spring connected thereto and held under tension, a readily flexible hollow member surrounding the spring and held by the hands of the user when guiding the mower, said spring being under sufficient tension to be maintained substantially straight between the handle parts and serving to prevent transmission of motor vibrations to the user's hands.

C. NEAL TURNER.

REFERENCES CITED

The following references are of record in the file of this patent:

UNITED STATES PATENTS

| Number | Name | Date |
|---|---|---|
| 356,129 | Hunter | Jan. 18, 1887 |
| 1,107,981 | Monroe | Aug. 18, 1914 |
| 1,298,211 | Hipwood | Mar. 25, 1919 |
| 2,362,867 | Ulrich | Nov. 14, 1944 |